United States Patent
Fang

(10) Patent No.: US 6,847,936 B2
(45) Date of Patent: Jan. 25, 2005

(54) ON-LINE SALES AND PROFIT OR DISCOUNT SHARING

(76) Inventor: Ko-Cheng Fang, 14F-E, No. 220, Sec. 3, Hui-Lai Road., Hsitun Dist., Taichung (TW)

( * ) Notice: Subject to any disclaimer, the term of this patent is extended or adjusted under 35 U.S.C. 154(b) by 357 days.

(21) Appl. No.: 10/043,121

(22) Filed: Jan. 14, 2002

(65) Prior Publication Data

US 2003/0101101 A1 May 29, 2003

(30) Foreign Application Priority Data

Nov. 28, 2001 (TW) ........................................ 90129389 A

(51) Int. Cl.[7] .............................................. G06F 17/60
(52) U.S. Cl. ........................................ 705/14; 705/26
(58) Field of Search ..................................... 705/14, 26

(56) References Cited

U.S. PATENT DOCUMENTS

| | | | | |
|---|---|---|---|---|
| 5,649,114 A | * | 7/1997 | Deaton et al. | 705/14 |
| 6,516,302 B1 | * | 2/2003 | Deaton et al. | 705/14 |
| 2002/0116212 A1 | * | 8/2002 | Shaw et al. | 705/1 |
| 2002/0169661 A1 | * | 11/2002 | Demsky et al. | 705/14 |
| 2003/0101102 A1 | * | 5/2003 | Kim | 705/26 |

FOREIGN PATENT DOCUMENTS

| | | | | |
|---|---|---|---|---|
| WO | WO 200171614 A2 | * | 9/2001 | G06F/17/60 |
| WO | WO 200247004 A2 | * | 6/2002 | G06F/17/60 |

OTHER PUBLICATIONS

PR Newswire, "Yellowbubble.com Launches Relationship Marketing Programme", Jun. 1, 2000.*

* cited by examiner

*Primary Examiner*—F. Zeender
(74) *Attorney, Agent, or Firm*—Troxell Law Office PLLC

(57) ABSTRACT

An on-line sales and profit or discount sharing method is executed by a sales center having a web site, and includes: a plan launching step, in which a sales plan is promoted through Internet media and/or conventional media, including goods descriptions, prices, specific time limits for placement of orders, quantities supplied, payment deadlines, discount sharing rules; an order managing step, in which a computer will automatically encode according to when an order was received; an order confirming step, in which orders are validated, removed, and substituted automatically according to the order received; a profit or discount sharing step, in which the profit or discount sharing amount, and/or special sharer amount are determined; and a notification and/or announcement step, in which the profit or discount sharing amount is individually provided and goods are delivered.

9 Claims, 1 Drawing Sheet

US 6,847,936 B2

ON-LINE SALES AND PROFIT OR DISCOUNT SHARING

BACKGROUND OF THE INVENTION

E-commerce is a new form of business. In terms of a transaction, the seller sets up a web site and puts the goods to be sold on the web site and/or a conventional medium for browsing by a visitor to the web site. After a purchaser has selected the goods and paid the price, the goods will be delivered to the purchaser, thereby completing a sales transaction. This mode of transaction is common knowledge to those that have had experience in on-line shopping.

Such on-line sales (or shopping) are merely transactions done through electronic means, and the prices of the goods are ordinary prices. For certain goods, gifts or discounts may be offered. However, as basically all on-line shoppers are entitled to such gifts or discounts, there is a lack of incentive. A major drawback with such a method is that the categories of the goods offered are not many and hence cannot draw customers' attention. On the other hand, more kinds of goods means more costs, and which means less profit. Therefore, many have encountered failures in e-commerce business.

Furthermore, from the standpoint of marketing, active marketing is the major means to promote sales. At the same time, a weakness in human nature is that one like to try one's luck or gamble. If such an incentive is provided, sales can be increased. This invention is different from gambling in that gambling requires the putting of bets and there are wins and losses. This invention is that consumers buy the goods and are entitled to share the profits or enjoy discounts, or even win a cash bonus. Specific products are sold to specific consumer groups within a time limit and/or at limited quantities to thereby save the costs of setting up web data displays like a large shopping mall. More importantly, price increase due to intermediate distributors can be eliminated, the problem of inferior product quality and waste of resources on promotion due to vicious competition among suppliers can be improved so that consumers do not have to pay more than necessary. If the difference due to the intermediate distributors can be converted into profits or discounts to give to the consumers, the consumers can get low-price and quality goods. Thus, sales can be promoted. At the same time, the suppliers can be specific orders in large amounts. Production can likewise be promoted, quality upgraded, promotional expenditures reduced, thereby promoting a healthy economic cycle. Besides, the sales center is responsible for examining and monitoring the suppliers and provide after-sales services to thereby increase the goodwill of the company. In addition, the whole process can be authenticated by a lawyer and/or accountant to ensure the interests of the consumers and the quality of the goods. In view of the foregoing, it can be appreciated that it is a win situation for each of the suppliers, the sales center, and the consumers.

SUMMARY OF THE INVENTION

Therefore, the primary object of the invention is to provide an on-line sales and profit or discount sharing method.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
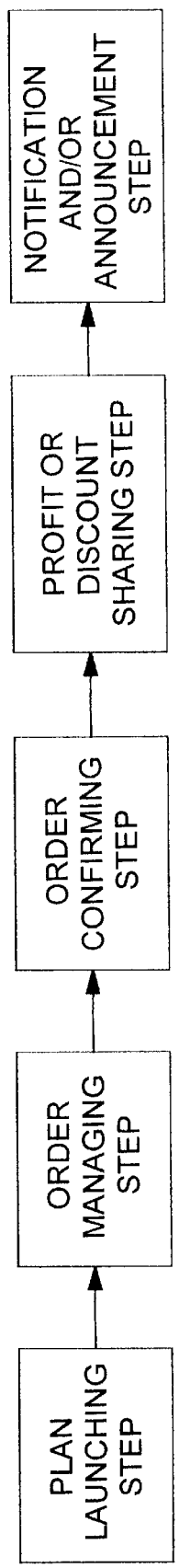
FIG. 1 is a flowchart of the method according to the invention.

Referring to FIG. 1, the method of the invention is to be executed by a sales center. The concept of this invention is that the sales center purchases goods from suppliers in large quantities so as to have discounts therefrom, and that on-line sales works in conjunction with the sequence of ordering and payment for the sharing of profit or discount differences so as to stimulate desires to buy.

The method is executed by the sales center in the form of a web site. Basically, the method includes a plan launching step, an order managing step, an order confirmation step, a profit or discount sharing step, and a notification and/or announcement step.

The plan launching step includes making preparations and discussions with suppliers to confirm costs, prices and quantities. The goods can be one or more tangible goods, or valuable documents, or services like travel, courses, concerts, etc. Then, according to the goods, digital files and/or promotional literature are made. The promotional literature includes description of the goods, selling prices, amounts, deadlines of placement or orders and payment, methods of delivery, etc. For purposes of delivery after ordering, the customer's basic data, such as name, ID card number, address (address of delivery), credit card number, etc. are included. Methods of payment and deadline dates are specified as remittance to specific accounts, or credit card payments, or other payment method, and orders are valid when payments are made before the deadlines.

In addition, in order to achieve the object of profit or discount sharing, it is also stated in the promotional literature that there are different levels of amounts or percentages of profit or discount to be shared according to the sequence of the valid order time. The determination of the levels can be, for example, the first 5% are in the first level, the first 20% are in the second level, the first 50% are in the third level, and the last level, for purposes of calculation of the candidates. The sharing can be an amount of money taken from the profits generated by the project. For instance, the first level get 25% of the amount; the second level get 20%; the third level get 15%, and the fourth level get 10%, but is not limited thereto. Certainly, specific sharing can be provided. For instance, the first in the sequence, or a predetermined number, for example, the numbers 25, 250, 2500, can be awarded a special cash bonus and/or goods free of charge.

The steps of the method are described in details as follows:

After preparing the promotional literature, the sales center displays it on the web site for browsing and ordering by the customers. To make the promotional literature known extensively, the sales center can also use traditional media to promote and/or send e-mail to notify specific potential customers or potential customers on file with a link connection to allow them to browse the promotional literature on the Internet. In order to ensure the customers, the sales center can entrust a lawyer and/or accountant to authenticate and publish the same on the promotional literature.

In the order management step, after the sales center has received and confirmed the customer's order, encoding is performed according to the sequence and the identity data of the customer, and a code is assigned to the customer. The code can be a combination code including the ID card number and the plan number. According to the sequence of the received order, preparations are made for checking whether payment is made. E-mail can be sent to advise the customer of information including the methods of payment, deadlines for making the payment, code, etc., for the customer to follow and confirm within a stipulated time limit so as to confirm the validity. The customer can also make inquiries at the web site. At the same time, the next promotional plan can be attached.

In the order confirming step, after the stipulated time limit has expired, orders for which payments are not made are removed and substituted by others according to the valid order list. The customers can be individually advised of their valid order serial numbers to confirm the validity of their orders through web site inquiry or e-mail.

In the profit or discount sharing step, after identifying the valid orders, the amount or percentage shared by each of the customers, and/or the special sharer list are determined according to the rule of sharing set forth in the promotional literature.

In the notification and/or announcement step, after the orders are confirmed and arranged in sequence to determine the amount or percentage of each of the customers and/or the special sharer list, the customers are advised by e-mail, and/or the same is announced on the web site. An announcement regarding the next sales plan can also be made. After confirmation, the goods are delivered. As this belongs to the prior art, a detailed discussion thereon is dispensed with. As such, the sales plan according to the invention is accomplished.

For limited goods, especially surplus orders that are made after the quota for the goods have been used up, order returning or non-acceptance can be included in the order managing step. That is, the e-mail address receiving orders can be closed at that time, and relevant information can be published on the web site to prevent entry of subsequent orders.

Therefore, by virtue of the present invention, the supplier can make a bulk sales at one time, and the sales center can make a sales plan for one or more similar products. Besides, since there are many orders, low prices can be obtained. In addition, since profit or discount sharing is based upon the sequence of ordering, customers can enjoy low prices and extra bonus. For the sales center, besides the income it is entitled to, the orders can be completed within a certain period of time since the orders are arranged in sequence. Thus, this invention helps create a win situation for all of the supplier, the sales center and the consumers, thereby creating new opportunities for e-commerce.

Although the present invention has been illustrated and described with reference to the preferred embodiment thereof, it should be understood that it is in no way limited to the details of such embodiment but is capable of numerous modifications within the scope of the appended claims.

What is claimed is:

1. An on-line sales and profit or discount sharing method, for execution by a sales center having a web site, said method comprising:

a plan launching step, in which the sales center puts up a sales plan in the form of digital promotional literature on the web site, the digital promotional literature including goods description, prices, specific time limit for placement of orders, quantity supplied, payment deadlines, discount sharing rules, methods of delivery, and/or fields for filling in customer's data; the promotional literature is advertised through conventional media;

an order managing step, in which after the sales center has received orders in the form of web pages or e-mail, encoding is performed according to a sequentially assigned order serial number and identity data of the customer and a code is assigned to the customer for the customer to follow and to respond within a stipulated time limit so as to confirm the validity of the order; a notice of the next sales plan is made simultaneously;

an order confirming step, in which valid orders for which payments are made within the stipulated time limit are arranged according to the sequence of the orders, and e-mail are sent to advise the customer of the validity of the order and to announce relevant information, the customer makes inquiries at the web site, a notice of the next sales plan is made at the same time as the announced relevant information; according to the sequence of the valid orders, the customer is individually asked to validate the order via web site inquiry or e-mail so as to confirm the validity of the order;

a profit or discount sharing step, in which after confirming the validity of the order in the order confirming step, according to the sharing rules in the promotional literature, a profit or discount sharing amount or percentage and/or special share amount are determined according to the order serial number of the customer;

a notification and/or announcement step, in which the customer is advised individually of the information relating to the profit or discount sharing amount, the goods are delivered, and announcements for future sales are distributed via e-mail and/or announcement.

2. The on-line sales and profit or discount sharing method as claimed in claim 1, wherein the goods are tangible goods, valuable documents, or services.

3. The on-line sales and profit or discount sharing method as claimed in claim 1, wherein the plan launching step includes the dissemination of advertisements by the sales center.

4. The on-line sales and profit or discount sharing method as claimed in claim 1, wherein the discount sharing rules include the determining of levels according to the sequence of the valid orders, different levels having different discounts and shared amounts.

5. The on-line sales and profit or discount sharing method as claimed in claim 1, wherein the discount sharing rules include a special cash bonus for a predetermined order serial number.

6. The on-line sales and profit or discount sharing method as claimed in claim 1, wherein the code is a combination of the order serial number, the identity data of the customer and a sales plan number.

7. The on-line sales and profit or discount sharing method as claimed in claim 1, wherein the method of payment is preferably payment by credit card or through specific bank account.

8. The on-line sales and profit or discount sharing method as claimed in claim 1, wherein the goods include a combination of one or more goods for joint sale and profit or discount sharing.

9. The on-line sales and profit or discount sharing method as claimed in claim 1, wherein the goods delivery operation includes the sending of a pick-up bill to the customer by the sale center for the customer to pick up the goods at the supplier; or the supplier delivers the goods by post or courier.

\* \* \* \* \*